(12) United States Patent
Takikawa (10) Patent No.: US 7,789,599 B2
(45) Date of Patent: Sep. 7, 2010

(54) DRILL

(75) Inventor: Yoshihiro Takikawa, Toyokawa (JP)

(73) Assignee: OSG Corporation, Aichi (JP)

( * ) Notice: Subject to any disclaimer, the term of this patent is extended or adjusted under 35 U.S.C. 154(b) by 595 days.

(21) Appl. No.: 11/811,564

(22) Filed: Jun. 11, 2007

(65) Prior Publication Data

US 2008/0089753 A1    Apr. 17, 2008

(30) Foreign Application Priority Data

Oct. 13, 2006    (JP) .............................. 2006-280765

(51) Int. Cl.
B23B 51/02    (2006.01)
(52) U.S. Cl. .................................... 408/230
(58) Field of Classification Search ................ 408/227, 408/229, 230; B23B 51/00, 51/02
See application file for complete search history.

(56) References Cited

U.S. PATENT DOCUMENTS 2,778,252 A * 1/1957 Oxford, Jr. .................. 408/230

3,564,947 A * 2/1971 Maier ......................... 408/211
5,423,640 A * 6/1995 Lindblom et al. ........... 408/230

FOREIGN PATENT DOCUMENTS

JP    58160009 A  *  9/1983
JP    2000-271811    10/2000

* cited by examiner

Primary Examiner—Daniel W Howell
(74) Attorney, Agent, or Firm—Muramatsu & Associates (57) ABSTRACT

A drill including a columnar body that is rotated about an axis, a cutting edge that is formed at the tip end of the body, and a thinning edge that is formed continuously with the cutting edge close to the axis of the body, by having a thinning at the tip end of the body. The thinning edge is formed such that a rake angle of the thinning edge relative to the axis of the body changes depending on a location of the thinning edge, where the rake angle of the thinning edge close to the cutting edge is a positive angle larger than that close to the axis of the body.

2 Claims, 4 Drawing Sheets

DRILL

BACKGROUND OF THE INVENTION

1. Field of the Invention

The present invention relates to a drill, and particularly to a drill in which the cutting resistance can be reduced during a cutting process while improving the tool life.

2. Description of the Invention

In order to reduce the cutting resistance during a cutting process, a thinning has conventionally been formed at the tip of a drill as, for example, a twist drill that is disclosed in Japanese Patent Application Laid-Open No. 2000-271811. According to the twist drill, the length of the chisel edge is shortened by having a thinning 5, and a contact area of the tip of the twist drill with a workpiece is accordingly reduced during a cutting process, which results in reduction of the cutting resistance.

Incidentally, according to the above-described twist drill, the cutting resistance can be reduced in general as a rake angle $\alpha$ of a thinning edge 6 that is formed by the thinning 5 is increased. On the other hand, when the rake angle is large, the thinning edge 6 is likely to be chipped due to reduction of the strength thereof.

Consequently, in the twist drill, the rake angle $\alpha$ of the thinning edge 6 is set in a range of 5 to 15 degrees so as to improve the tool life.

However, in the case where the rake angle $\alpha$ of the thinning edge 6 is set in consideration of the tool life as the above-described twist drill, there has been a problem that the cutting resistance can not be sufficiently reduced and it is difficult to satisfy both of the improvement of the tool life and the reduction of the cutting resistance.

SUMMARY OF THE INVENTION

The present invention has been achieved in order to address the above-described problem, and the object thereof is to provide a drill in which the cutting resistance can be reduced at the time of a cutting process while improving the tool life.

The first aspect of this invention provides a drill including: a columnar body that is rotated about an axis; a cutting edge that is formed at the tip end of the body; and a thinning edge that is formed continuously with the cutting edge closed to the axis of the body, by having a thinning at the tip end of the body, wherein the thinning edge is formed such that a rake angle of the thinning edge relative to the axis of the body changes depending on a location of the thinning edge, where the rake angle of the thinning edge close to the cutting edge is a positive angle larger than that close to the axis of the body.

According to the second aspect of the invention, in the drill defined in the first aspect of the invention, the thinning edge includes a first thinning edge that is located close to the axis of the body and that is formed in a substantially linear manner seen from the direction of the tip end of the body, and a second thinning edge that is located closer to the cutting edge relative to the first thinning edge and that is formed in a substantially linear manner seen from the direction of the tip end of the body, and the rake angle of the second thinning edge is a positive angle larger than that of the first thinning edge.

According to the third aspect of the invention, the drill defined in the second aspect of the invention further includes: a spiral groove that configures a flank of the cutting edge and is provided in a concave manner on the outer circumferential face of the body; and a leading edge that is formed at a ridge portion where a wall face of the groove on the rear side in the rotational direction intersects with the outer circumferential face of the body, where the rake angle of the second thinning edge is in a range of approximately one-fifth to one-half of a helix angle that is an angle formed by the axis of the body and the leading edge.

According to the fourth aspect of the invention, in addition to the drill defined in the first aspect of the invention, the thinning edge is formed in an arc manner seen from the direction of the tip end of the body, the rake angle is changed from the side of the axis of the body toward the side of the cutting edge, and the rake angle of the thinning edge close to the cutting edge is a positive angle larger than that close to the axis of the body.

According to the fifth aspect of the invention, the drill defined in the fourth aspect of the invention further includes: a spiral groove that configures a flank of the cutting edge and is provided in a concave manner on the outer circumferential face of the body; and a leading edge that is formed at a ridge portion where a wall face of the groove on the rear side in the rotational direction intersects with the outer circumferential face of the body, where the rake angle of the thinning edge is in a range of approximately one-fifth to one-half of a helix angle that is an angle formed by the axis of the body and the leading edge, at a point where the thinning edge is connected with the cutting edge.

According to a drill of the first aspect of the present invention, the rake angle of the thinning edge changes depending on its location, where the rake angle close to the cutting edge is a positive angle larger than that close to the axis of the body.

In general, as the rake angle of the thinning edge is larger, the biting property to the workpiece can be improved, and thus the cutting resistance can be reduced.

On the other hand, when the rake angle is large, the thinning edge is likely to be chipped due to the reduction of the strength thereof.

On the contrary, according to the drill of the present invention, the rake angle of the thinning edge which is located close to the axis of the body and which is low in circumferential velocity and is large in cutting resistance during a cutting process is set at an angle smaller than that close to the cutting edge. Accordingly, the strength capable of meeting the cutting resistance is given to the thinning edge. Further, by setting the rake angle close to the cutting edge at an angle larger than that close to the axis of the body, the biting property to the workpiece can be improved when the cutting process proceeds and the drill reaches a predetermined cutting depth.

Accordingly, the first aspect of the present invention has an effect that the cutting resistance at the time of a cutting process can be reduced by improving the biting property to the workpiece, while each thinning edge is prevented from being chipped to improve the tool life. Thereby, both the improvement of the tool life and the reduction of the cutting resistance can be satisfied.

In addition to the effect achieved by the drill according to the first aspect of the present invention, according to the drill of the second aspect of the present invention, each thinning edge includes the first thinning edge that is located close to the axis of the body, and the second thinning edge that is located closer to the cutting edge relative to the first thinning edge. Further, the rake angle of the second thinning edge is set at a positive angle larger than the rake angle of the first thinning edge. Accordingly, while giving the strength capable of meeting the cutting resistance to the first thinning edge, the biting property to the workpiece can be improved by the second thinning edge when the cutting process proceeds and the drill reaches a predetermined cutting depth.

Accordingly, the second aspect of the present invention has an effect that the cutting resistance at the time of a cutting process can be reduced by improving the biting property to the workpiece, while each thinning edge is prevented from being chipped to improve the tool life.

Further, the second aspect of the present invention has another effect that even in the case where each thinning edge is formed in a linear manner seen from the direction of the tip end of the body, the thinning edge in which the rake angle close to the axis of the body is different from that close to the cutting edge can be easily processed because each thinning edge includes the first thinning edge and the second thinning edge.

In addition to the effects achieved by the drill according to the second aspect of the present invention, the drill of the third aspect of the present invention has an effect that since the rake angle of each second thinning edge is set at an angle in a range of one-fifth to one-half of the helix angle, the tool life can be improved while improving the processing accuracy.

That is, when the rake angle is less than one-fifth of the helix angle, the cutting resistance is increased at the time of a cutting process, and the drill is likely to be oscillated. On the contrary, by setting the rake angle at one-fifth or more of the helix angle, the cutting resistance can be reduced so that the drill can be prevented from being oscillated, and as a result, the processing accuracy can be improved.

On the other hand, when the rake angle is more than one-half of the helix angle, the second thinning edge is likely to be chipped due to the reduction of the strength thereof. Accordingly, by setting the rake angle at one-half or less of the helix angle, the strength of the second thinning edge can be increased so that the second thinning edge can be prevented from being chipped and as a result, the tool life can be improved.

Further, the third aspect of the present invention has an effect that since the rake angle of the above-described second thinning edge is set in proportion to the helix angle, the rake angle of the second thinning edge can be set at an optimum rake angle suitable for a material of the workpiece. That is, since the helix angle is generally set in accordance with a material of the workpiece, the rake angle is set in proportion to the helix angle. Accordingly, with respect to, for example, a hard workpiece in which the helix angle is set at a high helix angle, the rake angle is set at a large value as similar to the helix angle, and thus an optimum rake angle can be set for a cutting process on the hard workpiece to reduce the cutting resistance.

In addition to the effect achieved by the drill according to the first aspect of the present invention, according to the drill of the fourth aspect of the present invention, the rake angle of each thinning edge is changed from the side of the axis of the body toward the side of the cutting edge, and the rake angle close to the cutting edge is a positive angle larger than that close to the axis of the body. Accordingly, while giving the strength capable of meeting the cutting resistance to each thinning edge, the biting property to the workpiece can be improved when the cutting process proceeds and the drill reaches a predetermined cutting depth.

Accordingly, the fourth aspect of the present invention has an effect that the cutting resistance at the time of a cutting process can be reduced by improving the biting property to the workpiece, while each thinning edge is prevented from being chipped to improve the tool life.

Further, since each thinning edge is formed in an arc manner seen from the direction of the tip end of the body, the rake angle of each thinning edge can be continuously changed from the side of the axis of the body toward the side of the cutting edge. Accordingly, the fourth aspect of the present invention has another effect that the reduction of the cutting resistance can be improved in comparison to the case in which each thinning edge is formed in a linear manner seen from the direction of the tip end of the body.

In addition to the effects achieved by the drill according to the fourth aspect of the present invention, the drill of the fifth aspect of the present invention has an effect that since the rake angle of each thinning edge is set at an angle in a range of one-fifth to one-half of the helix angle, at a point where each thinning edge is connected with each cutting edge, the tool life can be improved while improving the processing accuracy.

That is, when the rake angle is less than one-fifth of the helix angle, the cutting resistance is increased at the time of a cutting process, and the drill is likely to be oscillated. On the contrary, by setting the rake angle at one-fifth or more of the helix angle, the cutting resistance can be reduced so that the drill can be prevented from being oscillated, and as a result, the processing accuracy can be improved.

On the other hand, when the rake angle is more than one-half of the helix angle, the thinning edge is likely to be chipped due to the reduction of the strength thereof. Therefore, by setting the rake angle at one-half or less of the helix angle, the strength of the thinning edge can be increased so that the thinning edge can be prevented from being chipped, and as a result, the tool life can be improved.

Further, the fifth aspect of the present invention has an effect that since the rake angle of the above-described thinning edge is set as an angle at a point where the thinning edge is with the cutting edge, the thinning edge which is located close to the axis of the body and which is low in circumferential velocity and is large in cutting resistance during a cutting process is given the strength capable of meeting the cutting resistance, and further, the biting property to the workpiece can be improved when the cutting process proceeds and the drill reaches a predetermined cutting depth.

Further, the fifth aspect of the present invention has another effect that since the rake angle of the thinning edge at a point where the thinning edge is connected with the cutting edge is set in proportion to the helix angle, the rake angle of the thinning edge can be set at an optimum rake angle suitable for a material of the workpiece. That is, since the helix angle is generally set in accordance with a material of the workpiece, the rake angle is set in proportion to the helix angle. Accordingly, with respect to, for example, a hard workpiece in which the helix angle is set at a high helix angle, the rake angle is set at a large value similar to the helix angle, and thus an optimum rake angle can be set for a cutting process on the hard workpiece to reduce the cutting resistance.

BRIEF DESCRIPTION OF THE DRAWINGS

FIGS. 3A, 3B, and 3C are graphs showing the results of the cutting test, where

DETAILED DESCRIPTION OF THE INVENTION

Figure 1:
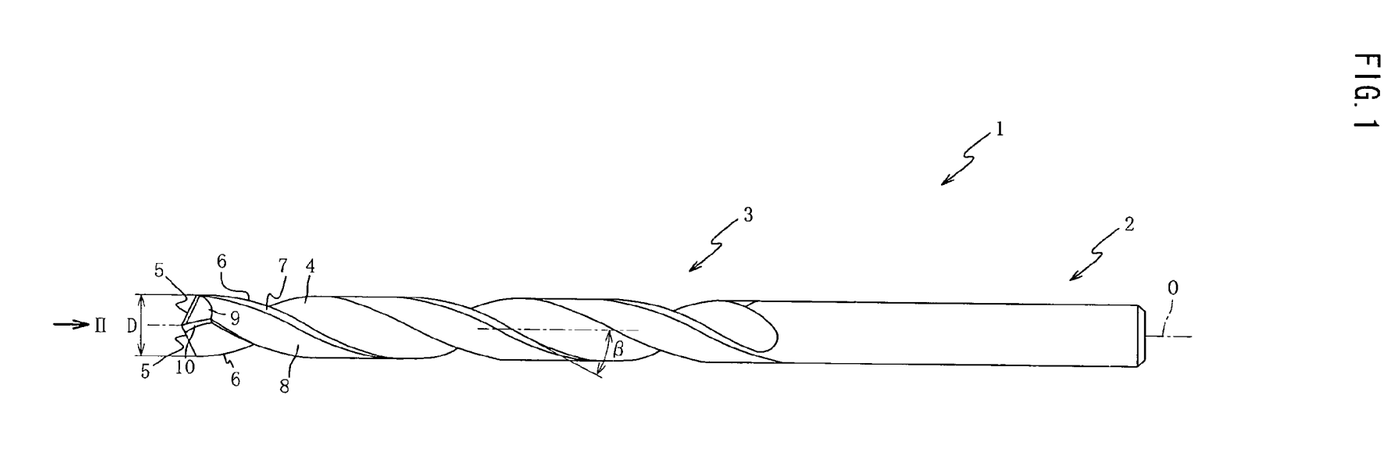
FIG. 1 is a side view of a drill according to the first embodiment of the present invention.

Hereinafter, preferred embodiments of the present invention will be described with reference to the drawings. FIG. 1 is a side view of a drill 1 according to the first embodiment of the present invention.

First, a schematic configuration of the drill 1 will be described with reference to FIG. 1. The drill 1 is a cutter for performing a drilling process on a workpiece by the torque that is transmitted from a processing machine such as a machining center. As shown in FIG. 1, the drill 1 is configured as a solid drill made of cemented carbide that is obtained by pressure sintering of tungsten carbide (WC) and the like, and mainly includes a shank 2 and a body 3 that is integrally molded with the shank 2.

The drill 1 is configured by using cemented carbide in the present embodiment, but the material thereof is not necessarily limited thereto. The drill 1 may be configured by using, for example, high-speed tool steel.

The shank 2 is a portion held by the processing machine, is configured in a columnar shape having substantially the same diameter as that of the body 3, and is provided on the same axis O as that of the body 3, as shown in FIG. 1. Holding of the shank 2 with a holder (not shown) allows the drill 1 to be attached to the processing machine.

It should be noted that the shank 2 is configured in a columnar shape having substantially the same diameter as that of the body 3 in the embodiment, but the configuration is not necessarily limited thereto. For example, the shank 2 may be larger in diameter than the body 3, or may be configured in a taper shape in which the diameter of the shank 2 is decreased toward the end portion side (the upper side in FIG. 1) of the drill 1.

The body 3 is a portion for performing a cutting process while being rotated by the torque that is transmitted from the processing machine through the shank 2. The body 3 is configured in a columnar shape having a diameter D that is substantially the same as that of a hole that is made by drilling a workpiece (not shown), and mainly includes grooves 4 and cutting edges 5, as shown in FIG. 1. It should be noted that the diameter D of the drill 1 is 6 mm in the embodiment.

Each groove 4 creates a rake face of the cutting edge 5, and is a portion for accommodating and discharging chips produced during a cutting process. Two grooves 4 are formed in a spiral and concave manner on the outer circumferential face of the body 3, and are symmetrical with respect to the axis O of the drill 1, as shown in FIG. 1.

It should be noted that each groove 4 is configured in a spiral manner with a helix in the embodiment, but the configuration is not necessarily limited thereto. Each groove 4 may be configured in a linear manner substantially in parallel with the axis O of the drill 1. Further, a leading edge 6 is formed in each ridge portion where the outer circumferential face of the body 3 intersects with a wall face of the groove 4 on the rear side in the rotational direction (refer to the direction of the arrow A in FIG. 2A) as shown in FIG. 1. Each leading edge 6 is provided such that a helix angle β formed by the leading edge 6 and the axis O of the drill 1 is set at 38 degrees, as shown in FIG. 1.

Furthermore, a margin 7 is provided in each leading edge 6 on the rear side in the rotational direction (refer to the direction of the arrow A in FIG. 2A) while being continuous with each leading edge 6 as shown in FIG. 1. Each margin 7 is used for grinding an inner wall face of a hole that is made by drilling the workpiece, and is formed by removing the outer circumferential face of the body 3 and then by establishing a relieving face 8.

Each cutting edge 5 is to cut the workpiece when being rotated by the torque that is transmitted from the processing machine. Two cutting edges 5 are formed in ridge portions where the tip end portion of the drill 1 intersects with the grooves 4, and are symmetrical with respect to the axis O of the drill 1, as shown in FIG. 1. Further, the cutting edges 5 are formed in a linear manner seen from the direction of the tip end of the drill 1, and are arranged in parallel with each other (refer to FIG. 2).

Figures 2A, 2B, 2C:
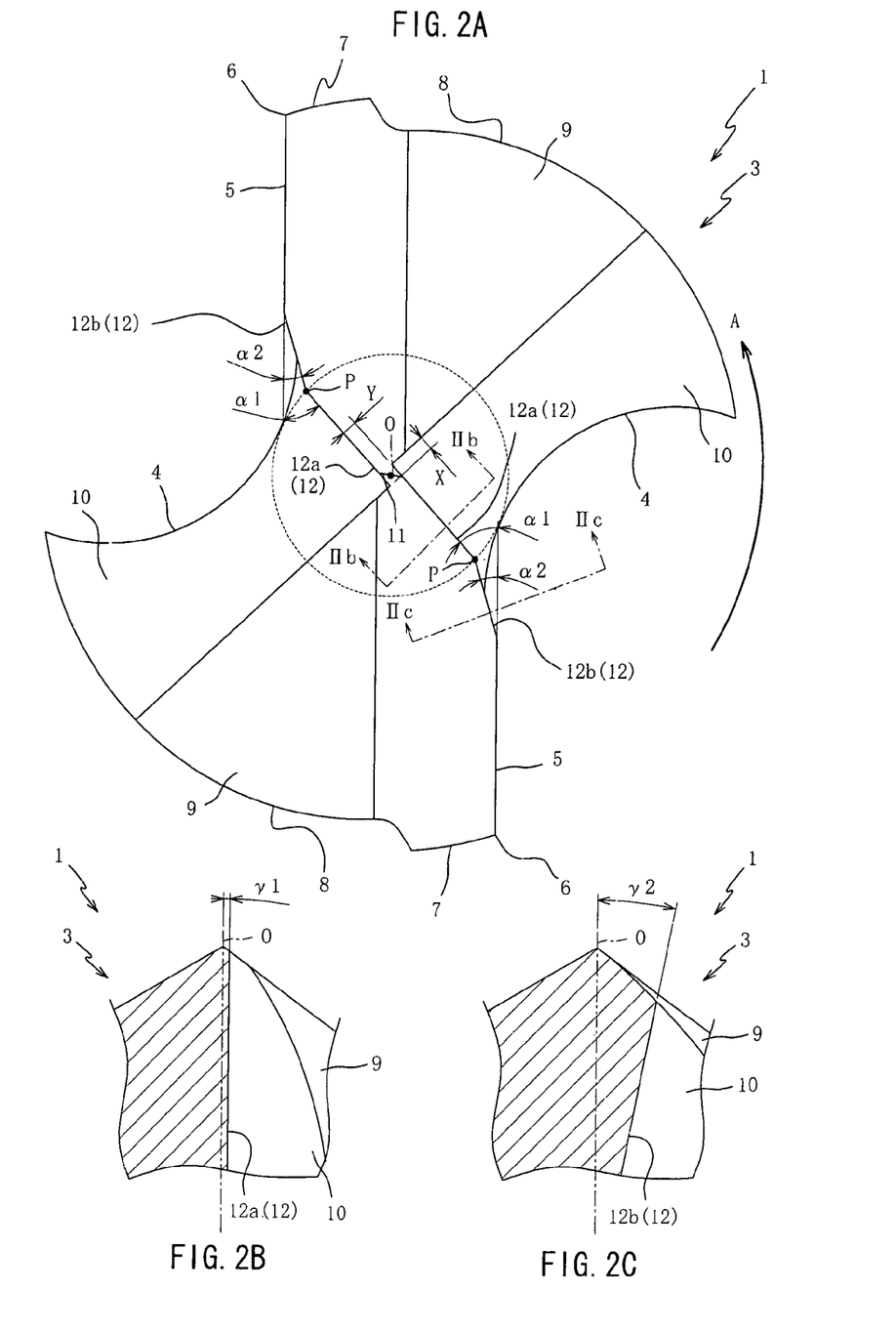
FIG. 2A is a front view of the drill seen from the direction of the arrow II in FIG. 1.
FIG. 2B is an enlarged sectional view of the drill taken along the line IIb-IIb in FIG. 2A.
FIG. 2C is an enlarged sectional view of the drill taken along the line IIc-IIc in FIG. 2A.

Next, a detailed configuration of the tip end portion of the body 3 will be described with reference to FIGS. 2A, 2B, and 2C. FIG. 2A is a front view of the drill 1 seen from the direction of the arrow II in FIG. 1, FIG. 2B is an enlarged sectional view of the drill 1 taken along the line IIb-IIb in FIG. 2A, and FIG. 2C is an enlarged sectional view of the drill 1 taken along the line IIc-IIc in FIG. 2A. It should be noted that the arrow A in FIG. 2A indicates the rotational direction of the drill 1.

As shown in FIG. 2A, flanks 9 and thinnings 10 are mainly formed at the tip end portion of the drill 1. Each flank 9 is to reduce the cutting resistance by decreasing a contact area of the tip end portion of the drill 1 with the workpiece during a cutting process. Each flank 9 is formed by removing the tip end portion of the drill 1, and is continuous with each cutting edge 5 on the rear side in the rotational direction A, as shown in FIG. 2A. Thereby, gaps are generated between the drill 1 and the workpiece during a cutting process, and friction between the drill 1 and the workpiece is accordingly decreased so as to reduce the cutting resistance.

It should be noted that two flanks 9 are formed corresponding to two cutting edges 5 in a concave manner, and are symmetrical with respect to the axis O of the drill 1, as shown in FIG. 2A, in the embodiment.

Even when the flanks 9 are provided at the tip end portion of the drill 1 as described above, the length of a ridge where two flanks 9 intersect with each other, which is called a chisel edge 11, still remains long. Due to the chisel edge 11, since a contact area of the tip end portion of the drill 1 with the workpiece becomes large during a cutting process, the cutting resistance can not be sufficiently reduced. Thus, each thinning 10 is formed continuously with the flank 9 on the rear side in the rotational direction A while extending up to a portion where the thinning 10 intersects with the groove 4, as shown in FIG. 2A.

Each thinning 10 is used for synergistically reducing the cutting resistance in combination with the flank 9, and is formed by removing the tip end portion of the drill 1 deeper than the flank 9, as shown in FIG. 2A. Thereby, the length of the chisel edge 11 is made shorter, and a contact area of the tip end portion of the drill 1 with the workpiece is decreased at the time of a cutting process, which results in reduction of the cutting resistance.

It should be noted that two thinnings 10 are provided in a concave manner while corresponding to two flanks 9, and are symmetrically provided with respect to the axis O of the drill 1, as shown in FIG. 2A, in the embodiment. Further, an intricate dimension X that is a dimension between the ridges where the flanks 9 intersect with the thinnings 10 is set at 0.4 mm, as shown in FIG. 2A.

Further, by providing each thinning 10 at the tip end portion of the drill 1, a thinning edge 12 is formed continuously with each cutting edge 5 at the tip end portion of the drill 1, as shown in FIG. 2A. Similar to the cutting edges 5, each thinning edge 12 cuts the workpiece while being rotated by the torque that is transmitted from the processing machine. Two thinning edges 12 are formed corresponding to the two thinnings 10, and are symmetrical with respect to the axis O of the drill 1, as shown in FIG. 2A.

Further, each thinning edge 12 includes a first thinning edge 12a that is located close to the axis O of the drill 1, and a second thinning edge 12b that is located closer to the cutting edge 5 compared to the first thinning edge 12a, as shown in FIG. 2A.

Each first thinning edge 12a to cut the center portion of a hole that is made by drilling the workpiece. Each first thinning edge 12a is formed in a linear manner seen from the direction of the tip end of the drill 1, and a center angle $\alpha 1$ formed by the first thinning edge 12a and the cutting edge 5 is 53 degrees, as shown in FIG. 2A. It should be noted that the center angle $\alpha 1$ is set at 53 degrees in the embodiment, but the angle is not necessarily limited thereto. It is preferable that the center angle $\alpha 1$ is selected from a range of 50 to 55 degrees.

That is, when the center angle $\alpha 1$ is less than 50 degrees, the biting property to the workpiece is deteriorated, and the drill 1 is likely to be oscillated. On the contrary, by setting the center angle $\alpha 1$ at 50 degrees or more, the biting property to the workpiece can be improved so that the drill 1 can be prevented from being oscillated, and as a result, the processing accuracy can be improved.

On the other hand, when the center angle $\alpha 1$ is more than 55 degrees, gaps between the first thinning edges 12a and the flanks 9 are reduced to deteriorate the chip-discharging property. Accordingly, by setting the center angle $\alpha 1$ at 55 degrees or less, the chip-discharging property can be improved so that the first thinning edge 12a can be prevented from being chipped, and as a result, the tool life can be improved.

Further, each first thinning edge 12a is configured such that a rake angle $\gamma 1$ formed by the first thinning edge 12a and the axis O of the drill 1 is set at 0 degree, as shown in FIG. 2B. It should be noted that the rake angle $\gamma 1$ is set at 0 degree in the embodiment, but the angle is not necessarily limited thereto. It is preferable that the rake angle $\gamma 1$ be set in a range of −5 to 5 degrees.

That is, when the rake angle $\gamma 1$ is less than −5 degrees, the cutting resistance is increased at the time of a cutting process, and the drill 1 is likely to be oscillated. On the contrary, by setting the rake angle $\gamma 1$ at −5 degrees or more, the cutting resistance can be reduced so that the drill 1 can be prevented from being oscillated, and as a result, the processing accuracy can be improved.

On the other hand, when the rake angle $\gamma 1$ is more than 5 degrees, the first thinning edge 12a is likely to be chipped due to the reduction of the strength thereof. Accordingly, by setting the rake angle $\gamma 1$ at 5 degrees or less, the strength of the first thinning edge 12a can be increased so that the first thinning edge 12a can be prevented from being chipped, and as a result, the tool life can be improved.

It should be noted that a space Y between cutting edges that is the shortest dimension between two first thinning edges 12a is set at 0.2 mm, as shown in FIG. 2A, in the embodiment.

Each second thinning edge 12b is located closer to the outer circumference of the drill 1, that is, the cutting edge 5 compared to the first thinning edge 12a, and is to cut a circumferential portion rather than the center portion of a hole that is made by drilling the workpiece by the first thinning edge 12a. Each second thinning edge 12b is formed in a linear manner seen from the direction of the tip end of the drill 1, and a center angle $\alpha 2$ formed by the second thinning edge 12b and the cutting edge 5 in continuous therewith is 27 degrees as shown in FIG. 2A. It should be noted that the center angle $\alpha 2$ is set at 27 degrees in the embodiment, but the angle is not necessarily limited thereto. It is preferable that the center angle $\alpha 2$ is selected from a range of 25 to 30 degrees.

That is, when the center angle $\alpha 2$ is less than 25 degrees, the biting property to the workpiece is deteriorated, and the drill 1 is likely to be oscillated. On the contrary, by setting the center angle $\alpha 2$ at 25 degrees or more, the biting property to the workpiece can be improved so that the drill 1 can be prevented from being oscillated, and as a result, the processing accuracy can be improved.

On the other hand, when the center angle $\alpha 2$ is more than 30 degrees, gaps between the second thinning edges 12b and the flanks 9 are reduced to deteriorate the chip-discharging property. Accordingly, by setting the center angle $\alpha 2$ at 30 degrees or less, the chip-discharging property can be improved so that the second thinning edge 12b can be prevented from being chipped, and as a result, the tool life can be improved.

Further, each second thinning edge 12b is configured such that a rake angle $\gamma 2$ formed by the second thinning edge 12b and the axis O of the drill 1 is set at 15 degrees, as shown in FIG. 2C. It should be noted that the rake angle $\gamma 2$ is set at 15 degrees in the embodiment, but the angle is not necessarily limited thereto. It is preferable that the rake angle $\gamma 2$ be set in a range of one-fifth to one-half of the above-described helix angle $\beta$.

That is, when the rake angle $\gamma 2$ is less than one-fifth of the helix angle $\beta$, the cutting resistance is increased at the time of a cutting process, and the drill 1 is likely to be oscillated. On the contrary, by setting the rake angle $\gamma 2$ at one-fifth or more of the helix angle $\beta$, the cutting resistance can be reduced so that the drill 1 can be prevented from being oscillated, and as a result, the processing accuracy can be improved.

On the other hand, when the rake angle $\gamma 2$ is more than one-half of the helix angle $\beta$, the second thinning edge 12b is likely to be chipped due to the reduction of the strength thereof. Accordingly, by setting the rake angle $\gamma 2$ at one-half or less of the helix angle $\beta$, the strength of the second thinning edge 12b can be increased so that the second thinning edge 12b can be prevented from being chipped, and as a result, the tool life can be improved.

Further, since the rake angle $\gamma 2$ of the above-described second thinning edge 12b is set in proportion to the helix angle $\beta$, the rake angle $\gamma 2$ of the second thinning edge 12b can be set at an optimum rake angle suitable for a material of the workpiece. That is, since the helix angle $\beta$ is generally set in accordance with a material of the workpiece, the rake angle $\gamma 2$ is set in proportion to the helix angle $\beta$. Accordingly, with respect to, for example, a hard workpiece in which the helix angle $\beta$ is set at a high helix angle, the rake angle $\gamma 2$ is set at a large value as similar to the helix angle $\beta$, and thus an optimum rake angle can be set for a cutting process on the hard workpiece to reduce the cutting resistance.

It should be noted that by setting the rake angle $\gamma 2$ of the second thinning edge 12b in a range of one-third to one-half of the helix angle $\beta$, the optimum rake angle further suitable for a material of the workpiece can be realized.

Further, each second thinning edge 12b is provided as shown in FIG. 2A such that a connection point P where the second thinning edge 12b is in connected with the first thinning edge 12a is located on a circle having a diameter of 1.85 mm about the axis O of the drill 1, seen from the direction of the tip end of the drill 1. It should be noted that the point (connection point) P is located on the circle having a diameter of 1.85 mm about the axis O of the drill 1, but the location of the point P is not necessarily limited thereto. It is preferable that the point P be located on a circle having a diameter in a range of one-fourth to one-third of the outer diameter D of the drill 1.

That is, when the point P is located on a circle having a diameter less than one-fourth of the outer diameter D of the drill 1, the range of each first thinning edge 12a becomes narrower, and thus the second thinning edge 12b is likely to be chipped. On the contrary, when the point P is located on a circle having a diameter of one-fourth or more of the outer diameter D of the drill 1, the range of each first thinning edge 12a becomes wider, and thus the second thinning edge 12b can be prevented from being chipped. As a result, the tool life can be improved.

On the other hand, when the point P is located on a circle having a diameter more than one-third of the outer diameter D of the drill 1, the range of each second thinning edge 12b becomes narrower, and thus the cutting resistance is increased. Accordingly, when the point P is located on a circle having a diameter of one-third or less of the outer diameter D of the drill 1, the range of each second thinning edge 12b becomes wider, and thus the cutting resistance can be reduced. As a result, the processing accuracy can be improved.

It should be noted that "seen from the direction of the tip end of the body" described in the claims corresponds to "seen from the direction of the arrow II in FIG. 1".

Next, there will be described a cutting test using the drill 1 which is configured as described above. The cutting test is a test in which a drilling process is performed on a workpiece by the drill 1 under a predetermined cutting condition to measure the component force of the cutting resistance applied on the drill 1 in the direction of the axis O (the left-right direction in FIG. 1), that is, the thrust resistance, and at the same time, to measure the amount of abrasion at outer circumferential corners of the drill 1.

It should be noted that the followings are the detailed specification of the cutting test.
Workpiece: JIS-S50C
Machine used: horizontal machining center
Cutting fluid: water-miscible cutting fluid
Cutting speed: 22 m/min
Feed speed: 140 mm/min
Processing depth: 100 mm (blind hole)
Step feed: 20 mm→30 mm→30 mm→20 mm There were used, in the cutting test, the drill 1 (hereinafter, referred to as "invention") as described in the embodiment and a drill (hereinafter, referred to as "conventional product") in which the rake angle of the thinning edge is set constant from the side of the axis of the body to the side of the cutting edge. However, the invention is different from the conventional product only in the configuration of the thinning edge, and other configurations are the same. Each thinning edge of the conventional product is formed in a substantially linear manner seen from the direction of the tip end of the drill, the center angle formed by the thinning edge and the cutting edge in conjunction therewith is set at 55 degrees, and the rake angle formed by the thinning edge and the axis of the drill is set at 0 degree.

Figure 3A:
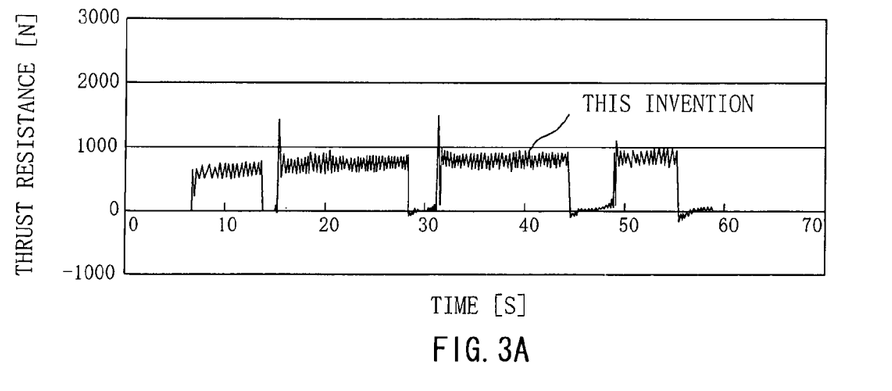
FIG. 3A shows thrust resistance in the invention.
Figure 3B:
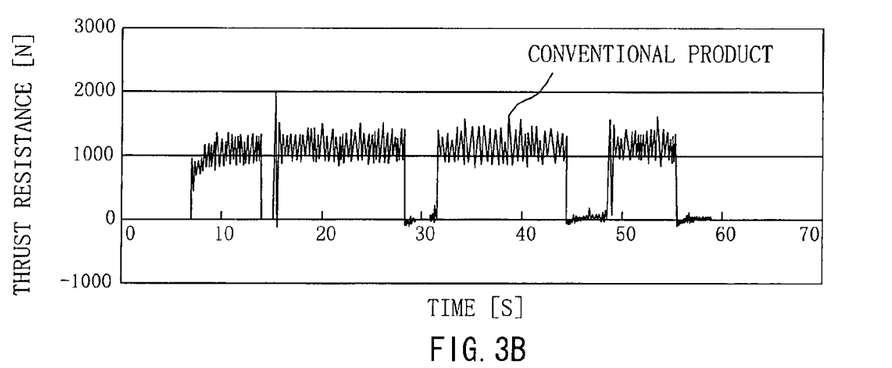
FIG. 3B shows thrust resistance in a conventional product.
Figure 3C:
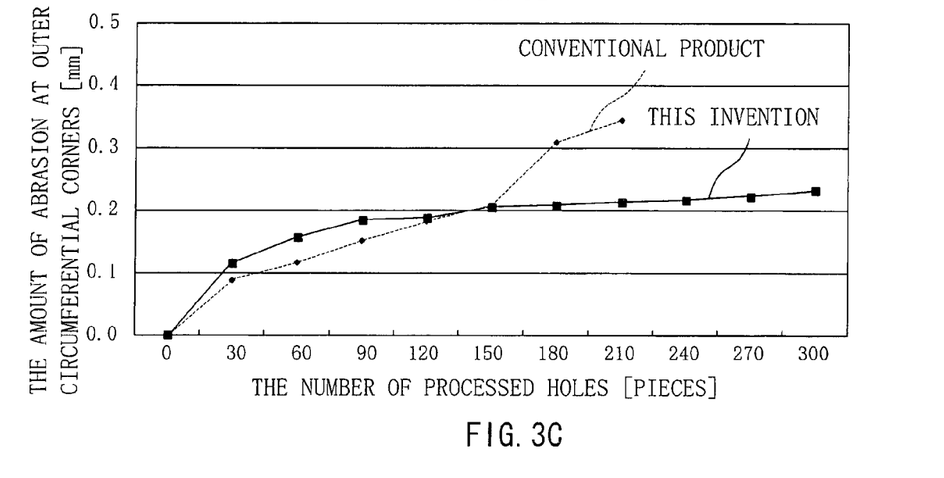
FIG. 3C shows the amount of abrasion at outer circumferential corners in the invention and the conventional product.

Here, there will be described the result of the cutting test with reference to FIGS. 3A, 3B, and 3C. FIGS. 3A, 3B, and 3C are graphs showing the result of the cutting test. FIG. 3A is a graph showing the thrust resistance in the invention, FIG. 3B is a graph showing the thrust resistance in the conventional product, and FIG. 3C is a graph showing the amount of abrasion at outer circumferential corners in the invention and the conventional product. FIG. 3C shows the amount of abrasion at outer circumferential corners with respect to the number of processed holes.

According to the result of the cutting test, it can be readily understood that the thrust resistance can be reduced in the invention in comparison to the conventional product as shown in FIGS. 3A and 3B. Specifically, the average value of the thrust resistance in the invention was 876N whereas that of the thrust resistance in the conventional product was 1155N.

Further, it can be readily understood that the amount of abrasion at outer circumferential corners can be reduced in the invention in comparison to the conventional product as shown in FIG. 3C. Specifically, the amount of abrasion at the outer circumferential corners in the invention was 0.23 mm even when the number of processed holes reached 300 whereas the amount of abrasion at outer circumferential corners in the conventional product was 0.35 mm when the number of processed holes reached 210.

As described above, according to the drill 1 in the embodiment, the rake angle of each thinning edge 12 close to the axis O of the body 3 is different from that close to the cutting edge 5, and further, the rake angle close to the cutting edge 5 is set at a positive angle larger than that close to the axis O of the body 3.

In general, as the rake angle of the thinning edge 12 is larger, the biting property to the workpiece can be improved, and thus the cutting resistance can be reduced. On the other hand, when the rake angle is large, the thinning edge 12 is likely to be chipped due to the reduction of the strength thereof.

On the contrary, according to the drill 1 in the embodiment, the rake angle of the thinning edge 12 which is located close to the axis O of the body 3 and which is low in circumferential velocity and is large in cutting resistance during a cutting process is set at an angle smaller than that close to the cutting edge 5. Accordingly, the strength capable of meeting the cutting resistance is achieved for the thinning edge 12. Further, by setting the rake angle close to the cutting edge 5 at an angle larger than that close to the axis O of the body 3, the biting property to the workpiece can be improved when the cutting process proceeds and the drill reaches a predetermined cutting depth.

Accordingly, the cutting resistance at the time of a cutting process can be reduced by improving the biting property to the workpiece, while each thinning edge 12 is prevented from being chipped to improve the tool life. Thereby, both the improvement of the tool life and the reduction of the cutting resistance can be satisfied.

In the drill 1 according to the embodiment, each thinning edge 12 includes the first thinning edge 12a that is located close to the axis 0 of the body 3, and the second thinning edge 12b that is located closer to the cutting edge 5 relative to the first thinning edge 12a. Further, the rake angle γ2 of the second thinning edge 12b is set at a positive angle larger than the rake angle γ1 of the first thinning edge 12a. Accordingly, while giving the strength capable of meeting the cutting resistance to the first thinning edge 12a, the biting property to the workpiece can be improved by the second thinning edge 12b when the cutting process proceeds and then the drill reaches a predetermined cutting depth.

Accordingly, the cutting resistance at the time of a cutting process can be reduced by improving the biting property to the workpiece, while each thinning edge 12 is prevented from being chipped to improve the tool life.

Further, even in the case where each thinning edge 12 is formed in a linear manner seen from the direction of the tip end of the body 3, the thinning edge 12 in which the rake angle close to the axis O of the body 3 is different from that close to the cutting edge 5 can be easily processed because each thinning edge 12 includes the first thinning edge 12a and the second thinning edge 12b.

Figure 4A:
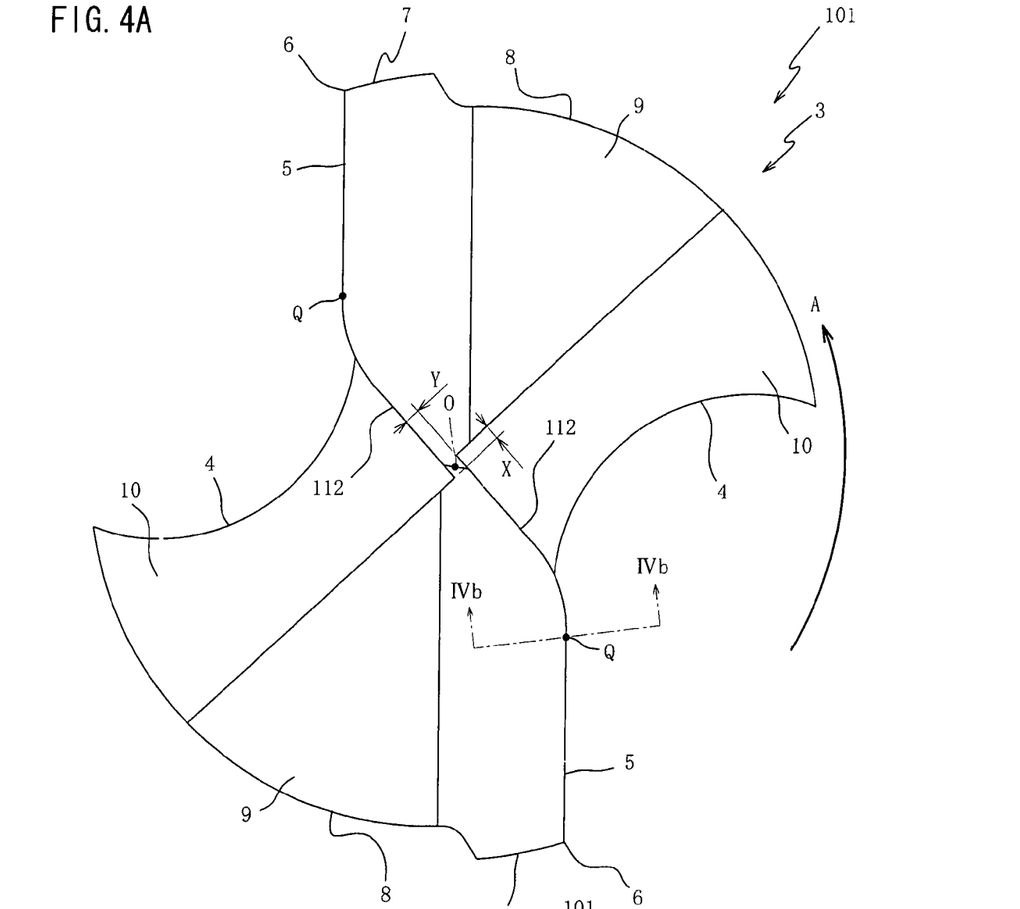
FIG. 4A is a front view of a drill according to the second embodiment of the present invention.
Figure 4B:
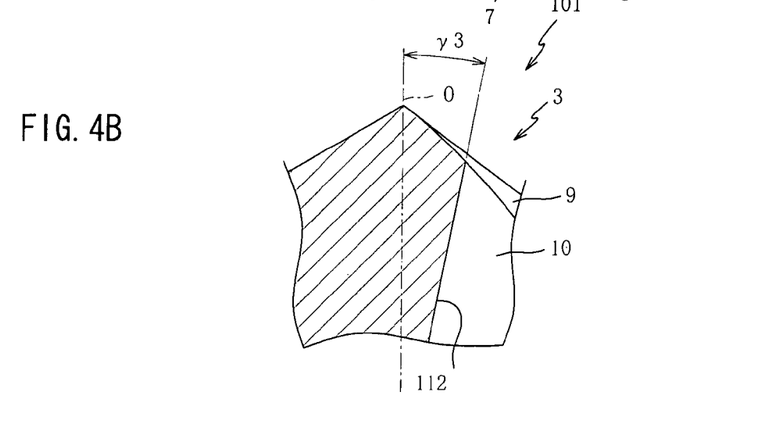
FIG. 4B is an enlarged sectional view of the drill taken along the line IVb-IVb in FIG. 4A.

Next, a drill 101 according to the second embodiment will be described with reference to FIGS. 4A and 4B. FIG. 4A is a front view of the drill 101 according to the second embodiment of the present invention, and FIG. 4B is an enlarged sectional view of the drill 101 taken along the line IVb-IVb in FIG. 4A. It should be noted that the identical elements in the second embodiment as those in the first embodiment will be given the same numerals, and the explanations and illustrations thereof will be omitted.

For the drill 1 in the first embodiment, the case in which each thinning edge 12 includes the first thinning edge 12a and the second thinning edge 12b, and each of the first thinning edge 12a and the second thinning edge 12b is formed in a linear manner seen from the direction of the tip end of the drill 1 has been described. For the drill 101 in the second embodiment, however, each thinning edge 112 is formed in an arc manner seen from the direction of the tip end of the drill 101, as shown in FIG. 4.

As similar to the cutting edges 5, each thinning edge 112 is used for cutting the workpiece while being rotated by the torque that is transmitted from the processing machine. Two thinning edges 112 are provided in a concave manner while corresponding to two flanks 9, and are symmetrically provided with respect to the axis O of the drill 101, as shown in FIG. 4A.

Further, each thinning edge 112 is formed in an arc manner seen from the direction of the tip end of the drill 101, as shown in FIG. 4A. Furthermore, the rake angle close to the cutting edge 5 is set at a positive angle larger than that close to the axis O such that the rake angle formed by the thinning edge 112 and the axis O of the drill 101 is changed from the axis O toward the cutting edge 5, and a rake angle γ3 at a connection point Q where the thinning edge 112 is connected with the cutting edge 5 is set at 15 degrees, as shown in FIG. 4B.

It should be noted that the rake angle γ3 is set at 15 degrees in the embodiment, but the angle is not necessarily limited thereto. It is preferable that the rake angle γ3 be set in a range of one-fifth to one-half of the helix angle β.

That is, when the rake angle γ3 is less than one-fifth of the helix angle β, the cutting resistance is increased at the time of a cutting process, and the drill 101 is likely to be oscillated. On the contrary, by setting the rake angle γ3 at one-fifth or more of the helix angle β, the cutting resistance can be reduced so that the drill 101 can be prevented from being oscillated, and as a result, the processing accuracy can be improved.

On the other hand, when the rake angle γ3 is more than one-half of the helix angle β, the thinning edge 112 is likely to be chipped due to the reduction of the strength thereof. On the contrary, by setting the rake angle γ3 at one-half or less of the helix angle β, the strength of the thinning edge 112 can be increased so that the thinning edge 112 can be prevented from being chipped and as a result, the tool life can be improved.

The rake angle γ3 of each thinning edge 112 is set as an angle at the point Q where the thinning edge 112 is connected with the cutting edge 5.

Accordingly, the thinning edge 112 which is located close to the axis O of the body 3 and which is low in circumferential velocity and is large in cutting resistance during a cutting process achieves the strength capable of meeting the cutting resistance, and moreover, the biting property to the workpiece can be improved when the cutting process proceeds and then the drill reaches a predetermined cutting depth.

Since the rake angle γ3 of each thinning edge 112 at the point Q where the thinning edge 112 is connected with the cutting edge 5 is set in proportion to the helix angle β, the rake angle γ3 of each thinning edge 112 can be set at an optimum rake angle suitable for a material of the workpiece. That is, since the helix angle β is generally selected in accordance with a material of the workpiece, the rake angle γ3 is set in proportion to the helix angle β. Accordingly, with respect to, for example, a hard workpiece in which the helix angle β is set large, the rake angle γ3 is set to a large value similar to the helix angle β, and thus an optimum rake angle can be set for a cutting process on the hard workpiece to reduce the cutting resistance.

It should be noted that by setting the rake angle γ3 of each thinning edge 112 at the point Q in a range of one-third to one-half of the helix angle β, the optimum rake angle further suitable for a material of the workpiece can be realized.

As described above, according to the drill 101 in the embodiment, the rake angle of each thinning edge 112 is changed from the side of the axis O of the body 3 toward the side of the cutting edge 5, and further, the rake angle close to the cutting edge 5 is set at a positive angle larger than that close to the axis O of the body 3. Accordingly, the strength capable of meeting the cutting resistance is attained to each thinning edge 112, and further, the biting property to the workpiece can be improved when the cutting process proceeds and then the drill reaches a predetermined cutting depth.

Accordingly, the cutting resistance at the time of a cutting process can be reduced by improving the biting property to the workpiece, while each thinning edge 112 is prevented from being chipped to improve the tool life.

Further, since each thinning edge 112 is formed in an arc manner seen from the direction of the tip end of the body 3, the rake angle of each thinning edge 112 can be continuously changed from the side of the axis O of the body 3 toward the side of the cutting edge 5. Accordingly, the reduction of the cutting resistance can be improved in comparison to the case in which each thinning edge 112 is formed in a linear manner seen from the direction of the tip end of the body 3.

The present invention has been described above based on the embodiments. However, the present invention is not limited to the above-described embodiments in any way, and it can be readily understood that various changes and modifications can be made in a range without departing from the gist of the present invention.

For example, the values given in the respective embodiments are merely an example, and it is obvious that other values can be employed.

In the respective embodiments, the case in which the drills 1 and 101 are configured to respectively include two cutting edges 5 has been described. However, the number of cutting edges is not necessarily limited thereto. The drills 1 and 101 may be configured to respectively include, for example, 3 or more cutting edges.

In the first embodiment, the case in which each thinning edge 12 includes the first thinning edge 12a and the second thinning edge 12b has been described. However, the configuration is not necessarily limited thereto. For example, the drill 1 may be configured to include a third thinning edge which is continuous with the second thinning edge 12b and which is located closer to the cutting edge 5 relative to the second thinning edge 12b. In this case, by setting the rake angle of the third thinning edge at an angle larger than the rake angle γ2 of the second thinning edge 12b, the cutting resistance during a cutting process can be reduced while improving the tool life.

What is claimed is:

1. A drill comprising:

a body that is rotated about an axis;

a cutting edge that is formed at a tip end of the body; and a thinning edge that is formed continuously with the cutting edge and that is formed close to the axis of the body, by having a thinning at the tip end of the body, wherein the thinning edge is formed such that a rake angle of the thinning edge relative to the axis of the body changes depending on a location of the thinning edge, and wherein the thinning edge includes a first thinning edge that is located close to the axis of the body and a second thinning edge that is located closer to the cutting edge relative to the first thinning edge where the first and second thinning edges are formed in a substantially linear manner seen from the direction of the tip end of the body, and the rake angle of the second thinning edge is a positive angle larger than that of the first thinning edge.

2. The drill according to claim 1, further comprising:

a spiral groove that configures a flank of the cutting edge and is provided in a concave manner on the outer circumferential face of the body; and a leading edge that is formed at a ridge portion where a wall face of the groove on the rear side in the rotational direction intersects with the outer circumferential face of the body, wherein the rake angle of the second thinning edge is set at an angle in a range of approximately one-fifth to one-half of a helix angle that is an angle formed by the axis of the body and the leading edge.

* * * * *